United States Patent
Kowalski

Patent Number: 6,158,766
Date of Patent: Dec. 12, 2000

[54] VEHICLE FLOOR SYSTEM INCORPORATING AIRBAG

[75] Inventor: Edward L. Kowalski, Rochester Hills, Mich.

[73] Assignee: Lear Corporation, Southfield, Mich.

[21] Appl. No.: 09/258,425

[22] Filed: Feb. 26, 1999

[51] Int. Cl.[7] .......................... B60R 21/22; B60R 21/02; B60R 21/04

[52] U.S. Cl. .................. 280/730.1; 280/748; 280/751

[58] Field of Search ................ 280/730.1, 748, 280/751, 735, 743.1, 728.1

[56] References Cited

U.S. PATENT DOCUMENTS

| | | |
|---|---|---|
| 3,591,232 | 7/1971 | Simon . |
| 4,154,472 | 5/1979 | Bryll . |
| 4,225,178 | 9/1980 | Takada . |
| 4,948,168 | 8/1990 | Adomeit et al. . |
| 5,312,131 | 5/1994 | Kitagawa et al. . |
| 5,340,185 | 8/1994 | Vollmer . |
| 5,458,366 | 10/1995 | Hock et al. . |
| 5,695,242 | 12/1997 | Brantman et al. . |

Primary Examiner—Brian L. Johnson
Assistant Examiner—Joselynn Sliteris
Attorney, Agent, or Firm—Brooks & Kushman P.C.

[57] ABSTRACT

A vehicle safety system includes a floor pan, an inflatable airbag and inflator integrated into the carpet and positioned on the floor pan. The airbag is positioned on the floor pan in a footwell area to selectively raise the foot of a vehicle occupant when the airbag is deployed.

9 Claims, 1 Drawing Sheet

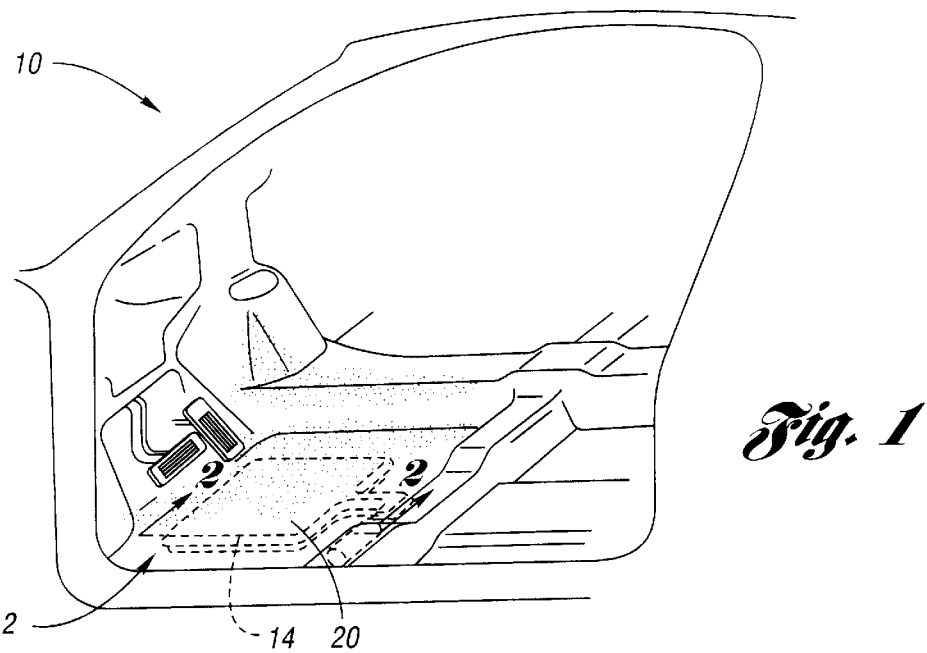
*Fig. 1*
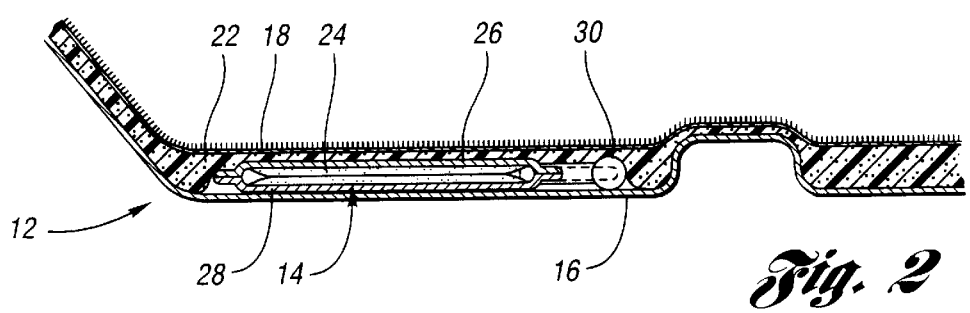
*Fig. 2*
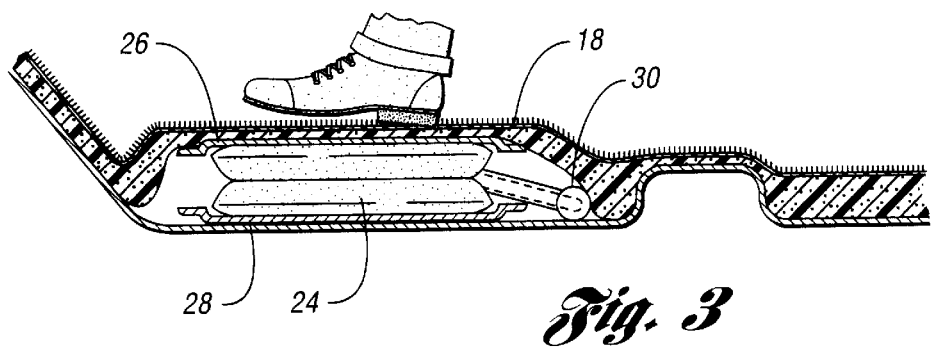
*Fig. 3*
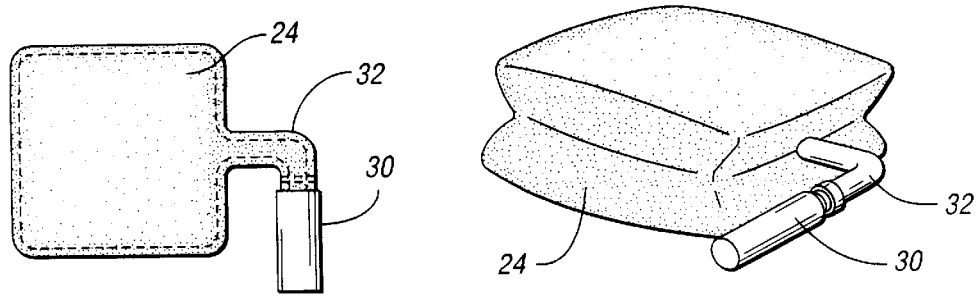
*Fig. 4*
*Fig. 5*

VEHICLE FLOOR SYSTEM INCORPORATING AIRBAG

TECHNICAL FIELD

The present invention relates to a vehicle flooring system incorporating an airbag for raising the feet of a vehicle occupant upon impact to prevent engagement of the feet with the vehicle toe pan.

BACKGROUND ART

Offset frontal crash testing results published by NHTSA suggests that the lower extremities of the test dummies may be exposed to significant forces upon impact. This test dummy injury data is a result of encroachment of the toe pan into the footrest area of the vehicle front seats.

Accordingly, it is desirable to minimize the affects of toe pan encroachment into the front seat footrest areas of a vehicle.

DISCLOSURE OF INVENTION

The present invention relates to a vehicle safety system in which an airbag and inflator assembly are integrated into the carpet of a vehicle in a footrest area in order to raise the foot or feet of a vehicle occupant on impact to prevent engagement of the lower extremities of the occupant with the toe pan of the vehicle in a frontal impact. The airbag is covered by a flat protective plate to prevent puncture.

More specifically, the present invention provides a vehicle safety system, including a floor pan, and an inflatable airbag and inflator assembly integrated into the carpet on the floor pan. The integrated carpet/airbag system is positioned on the floor pan in a footwell area to selectively raise the foot of a vehicle occupant when the airbag is deployed. The airbag and inflator assembly is secured to the carpet by a foam-in-place operation.

Preferably, a protector plate is positioned between the airbag and the carpet in order to protect the airbag from puncture, such as by the heel of a shoe. Also, the airbag assembly is preferably sealed to prevent moisture entry.

Accordingly, an object of the invention is to provide a vehicle safety system in which an airbag is deployable from underneath the carpet to raise the feet of a vehicle occupant upon impact.

The above object and other objects, features and advantages of the present invention are readily apparent from the following detailed description of the best mode for carrying out the invention when taken in connection with the accompanying drawings.

BRIEF DESCRIPTION OF DRAWINGS

FIG. 1 shows a schematically arranged perspective view of a vehicle incorporating an integrated carpet/airbag system in accordance with the present invention;

FIG. 2 shows a longitudinal cross-sectional view of the integrated carpet/airbag system shown in FIG. 1;

FIG. 3 shows a longitudinal cross-sectional view of the integrated carpet/airbag system of FIG. 2 with the airbag deployed;

FIG. 4 shows a plan view of the airbag and inflator assembly shown in FIG. 1; and FIG. 5 shows a perspective view of the airbag and inflator assembly of FIG. 4 with the airbag inflated.

DETAILED DESCRIPTION OF THE PREFERRED EMBODIMENT

FIGS. 1 and 2 show a vehicle 10 incorporating an integrated carpet/airbag safety system 12 in accordance with the present invention. As shown, an integrated carpet/airbag safety system 12 comprises an inflatable airbag assembly 14 integrated into the carpet 18 on the floor pan 16 in a footwell area 20 of the vehicle floor.

As illustrated in FIG. 2, foam padding 22 is provided between the airbag assembly 14 and the carpet 18. The foam is used to retain the airbag assembly 14 and inflator 30 onto the carpet, thereby integrating these components into the carpet. This is performed by a foam-in-place operation in which the airbag assembly 14 and inflator 30 are laid in a mold with the carpet, and foam 22 is sprayed therearound. The mold is closed and the foam expands to fill all areas. The foam 22 adheres to the carpet 18 and the airbag assembly 14 and inflator 30, thereby forming the integrated carpet/airbag safety system 12.

The airbag assembly 14 comprises an airbag 24 positioned between a protective upper plate 26 and a bottom plate 28. The protective upper plate 26 is preferably a hard plastic material, such as ABS, in order to protect the airbag 24 from puncture, such as from a heel of a shoe. The protective upper plate 26 and bottom plate 28 are preferably sealed, such as by shrinkwrapping or any other known seal, in order to protect the airbag 24 from moisture.

As shown in FIGS. 4 and 5, the inflator 30 is connected to the airbag 24 by an elbow 32 for inflating the airbag 24 to the position shown in FIGS. 3 and 5, wherein the carpet 18 is raised. In the collapsed position shown in FIG. 2, the airbag assembly 14 has an overall thickness of approximately 10 mm, and in the deployed position of FIG. 3 the airbag assembly 14 has an overall thickness of approximately 60 mm. In this configuration, the foot of a vehicle occupant is raised While the best mode for carrying out the invention has been described in detail, those familiar with the art to which this invention relates will recognize various alternative designs and embodiments for practicing the invention within the scope of the appended claims.

What is claimed is:

1. A vehicle safety system comprising:
    a floor pan;
    an inflatable airbag and inflator integrated into a carpet and positioned on the floor pan;
    wherein said airbag is positioned on the floor pan in a footwell area to selectively raise the foot of a vehicle occupant when the airbag is deployed.

2. The vehicle safety system of claim 1, wherein the airbag and inflator are secured to the carpet by foam.

3. The vehicle safety system of claim 1, further comprising a protector plate positioned between the airbag and the carpet to protect the airbag.

4. The vehicle safety system of claim 3, further comprising a bottom plate cooperating with the protector plate to enclose the airbag.

5. The vehicle safety system of claim 4, wherein said bottom plate and protector plate are sealed to protect the airbag from moisture.

6. The vehicle safety system of claim 1, wherein the airbag comprises a thickness of approximately 10 mm before deployment and approximately 60 mm after deployment.

7. A vehicle safety flooring system comprising:
    a carpet positioned in a footwell area of the vehicle; and
    an inflatable airbag and inflator integrated into the carpet in the footwell area to selectively raise the foot of a vehicle occupant when the airbag is deployed.

8. The flooring system of claim 7, further comprising a protector plate positioned between the airbag and the carpet to protect the airbag from puncture.

9. The flooring system of claim 7, wherein said inflatable airbag and inflator are secured to the carpet by foam.

* * * * *